L. T. HAGAN.
BELT SHIFTER.
APPLICATION FILED APR. 29, 1911.
1,036,487.
Patented Aug. 20, 1912.
3 SHEETS—SHEET 1.
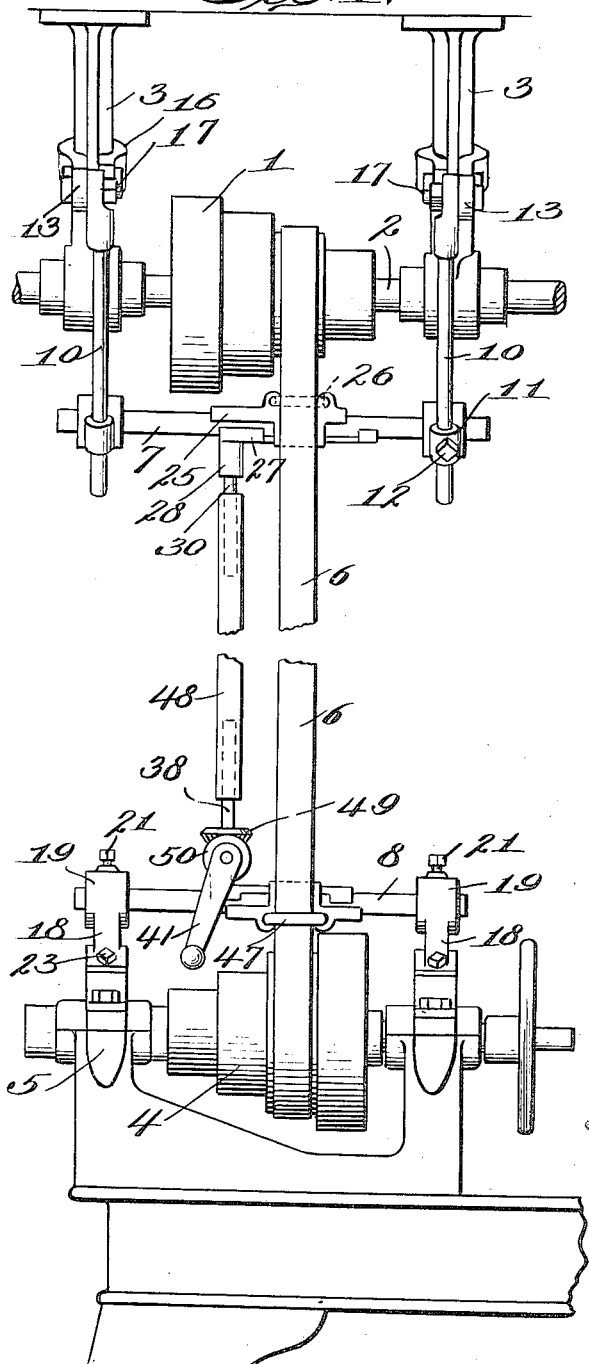
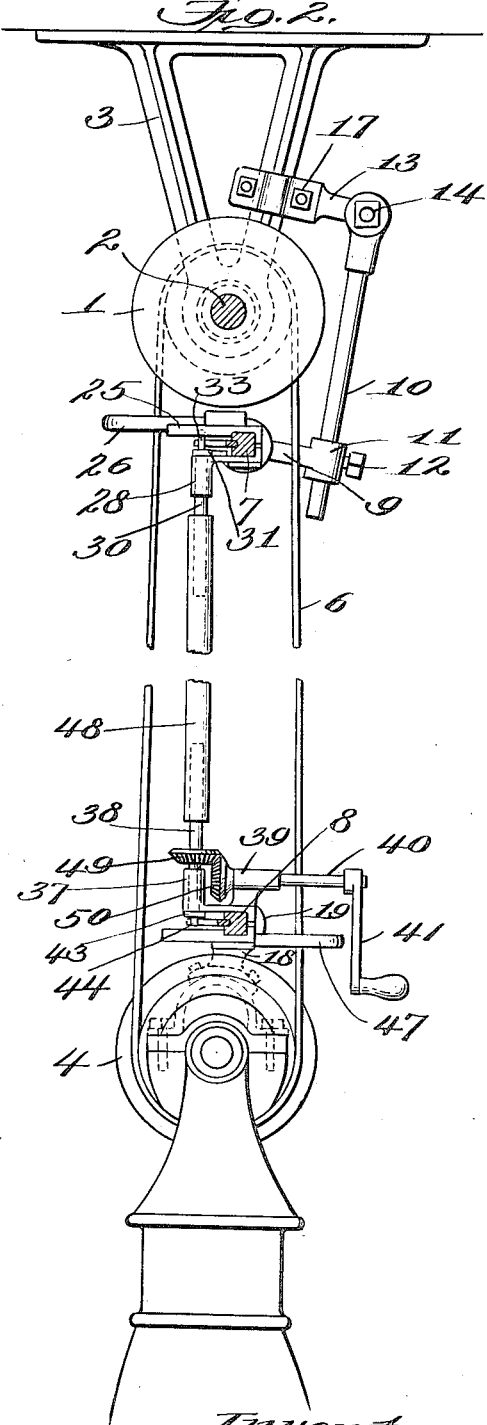
Witnesses:
Inventor
Louis T. Hagan L. T. HAGAN.
BELT SHIFTER.
APPLICATION FILED APR. 29, 1911.
1,036,487.
Patented Aug. 20, 1912.
3 SHEETS—SHEET 2.
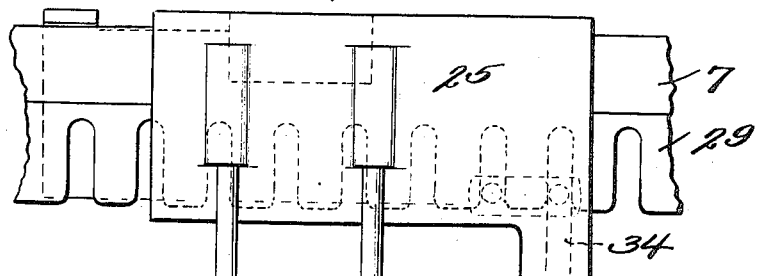
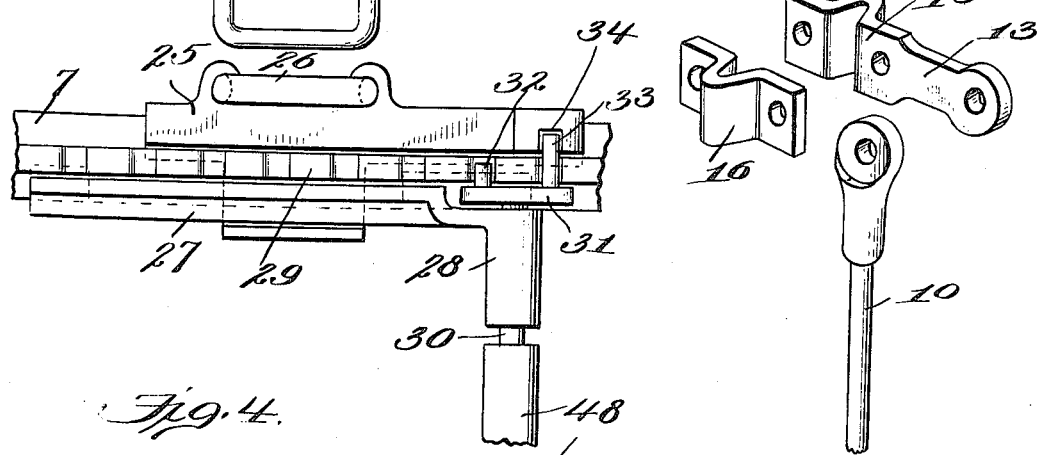
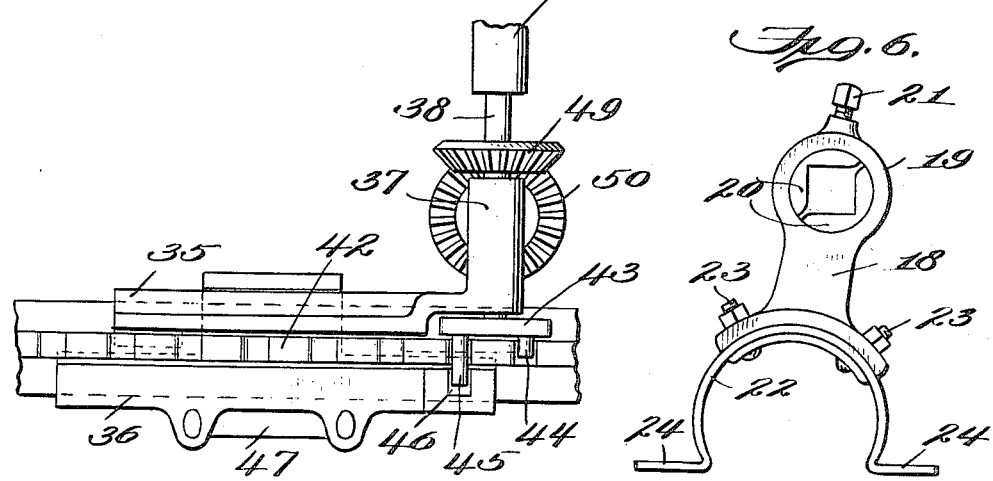
Witnesses:
Inventor
Louis T. Hagan

L. T. HAGAN.
BELT SHIFTER.
APPLICATION FILED APR. 29, 1911.

1,036,487.

Patented Aug. 20, 1912.
3 SHEETS—SHEET 3.

Witnesses:

Inventor
Louis T. Hagan

UNITED STATES PATENT OFFICE.

LOUIS T. HAGAN, OF WINCHESTER, KENTUCKY.

BELT-SHIFTER.

1,036,487. Specification of Letters Patent. Patented Aug. 20, 1912.

Application filed April 29, 1911. Serial No. 624,063.

*To all whom it may concern:*

Be it known that I, LOUIS T. HAGAN, a citizen of the United States, residing at Winchester, in the county of Clark and State of Kentucky, have invented new and useful Improvements in Belt-Shifters, of which the following is a specification.

My present invention relates to improvements in belt shifters and more particularly to the type adapted for the shifting of belts between stepped cone pulleys, and it is the primary object of the invention to provide novel and improved means whereby the operation of shifting a belt with respect to the steps of the cone pulleys can be accomplished quickly and with facility, mechanism being provided whereby the belt-shifting guides will be operated automatically and in predetermined relations in order to properly shift the belt upon the respective pulleys.

More specifically, the invention provides belt-shifting guides for the cone pulleys together with operating mechanism therefor whereby in shifting the belt from one of the cone sections or steps of smaller diameter to a step of larger diameter on one pulley, the belt-shifting guide for the other pulley will first operate to transfer the belt to the next lower step and the belt-shifting guide for the other pulley will subsequently operate to transfer the belt from the smaller to the larger stepped portion of its respective pulley, the foregoing order of operation being maintained or insured when the belt is being shifted in either direction.

To these and other ends, the invention consists in certain improvements, and combinations and arrangements of parts, all as will be hereinafter more fully described, the novel features being pointed out more particularly in the claims at the end of the specification.

Figure 7:
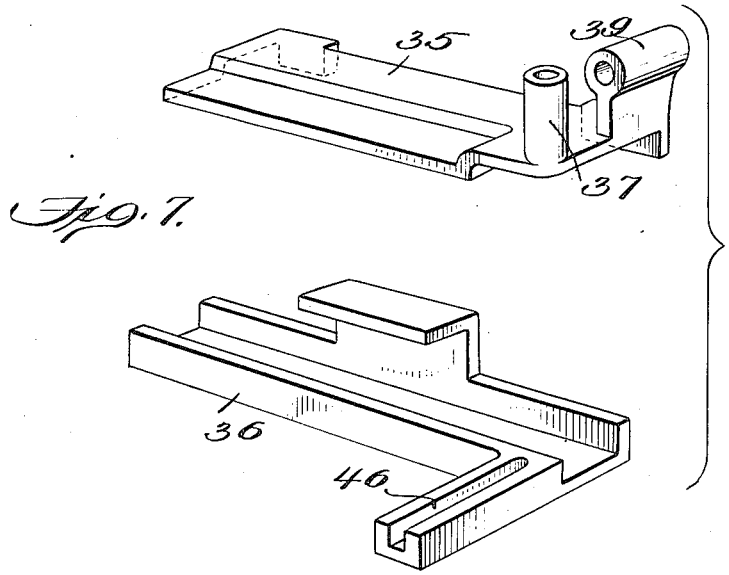
Figure 8:
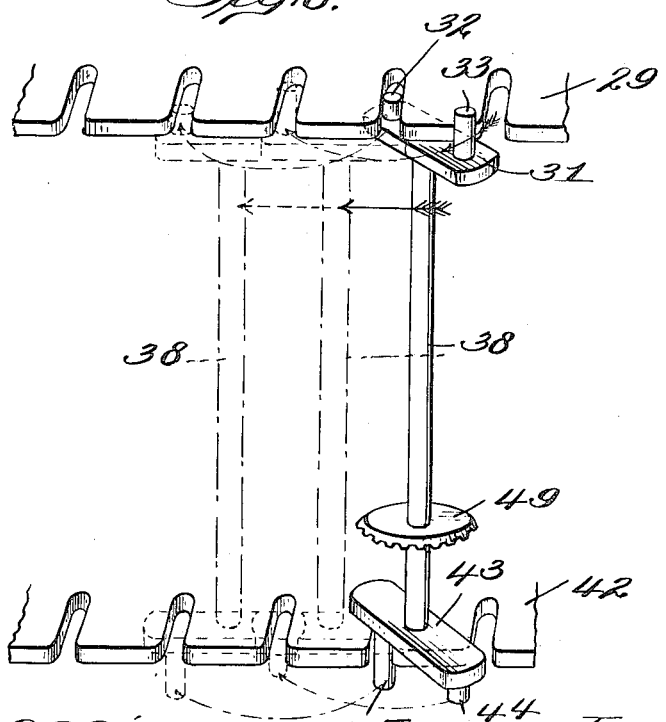

In the accompanying drawing:—Figure 1 represents a front elevation of belt-shifting mechanism constructed in accordance with one embodiment of my invention; Fig. 2 represents a transverse vertical section of the belt-shifting mechanism as viewed from the left in Fig. 1; Fig. 3 represents a detail view on an enlarged scale of one of the belt-shifting guides; Fig. 4 is a detail view of both belt-shifting guides and the operating mechanism therefor, the parts being shown in elevation; Fig. 5 is a view showing in perspective the elements of a bracket member for supporting the upper part of the belt-shifting mechanism; Fig. 6 is a detail view of a bracket for supporting the lower portion of the belt-shifting mechanism; Fig. 7 is a view showing in perspective the slide and belt-shifting guide for the lower part of the mechanism; and Fig. 8 is a diagrammatic view showing the manner in which the respective belt-shifting guides are operated.

Similar parts are designated by the same reference characters in the several views.

Belt shifters constructed in accordance with my present invention are applicable generally to machinery of various kinds wherein stepped cone pulleys are used. I have shown in the accompanying drawing one specific embodiment of the invention and in this instance the invention is shown in connection with the cone pulleys for operating a lathe or similar tool, 1 representing the cone pulley of the driving or counter-shaft 2 which is supported in bearings provided by the usual hangers 3, and the lower cone pulley 4 is mounted on the spindle of the lathe, the spindle being journaled as usual in bearings on the head stock 5.

6 represents the belt which connects the two stepped cone pulleys.

The belt-shifting mechanism comprises generally a pair of guide bars 7 and 8 which are suitably supported in fixed relation to the respective cone pulleys. In the present instance the upper bar 7 is supported by arms 9 which adjustably receive the lower ends of the rods 10, the rod 10 sliding through the head 11 on the arm 9 and a set-screw 12 serving to lock the parts in different adjusted relations. The upper end of each rod 10 is connected to a bracket arm 13 by means of a clamping bolt 14, the latter serving to secure the bracket arm 13 and the rod 10 in different desired angular relations. The bracket arm 13 is formed as a part of a clamping member 15 and a complemental clamping member 16, and clamping bolts 17 are provided whereby the clamp may be rigidly secured to one arm of the respective shaft hanger, the clamping members of the bracket being preferably shaped to fit or conform to the cross-section of that part of the hanger which it is to engage. The lower guide bar 8 is supported by a pair of brackets 18, the upper end of each of these brackets having a head 19 containing a pair of clamping jaws 20 which engage the bar 8, and a set-screw 21 serves to rigidly secure the guide bar to the clamping jaws 20 and to secure the clamping jaws 20 from rotation in the head 19 of the bracket, the clamping jaws 20 being preferably of circular form in order to permit rotary adjustment of the bar 8. Each bracket 18 is supported on the head stock of the lathe in the present instance by a base 22 which preferably has a rounded section which fits a correspondingly round section of the bracket 18 and is secured thereto in different adjusted relations by the bolts 23, and the feet 24 of the base may be secured to the head stock by the same bolts which secure the journal caps thereto.

A slide 25 is mounted to move longitudinally of the upper bar 7 and this slide carries a suitable belt guide which in the present instance is in the form of a loop 26. A slide 27 is also mounted to move longitudinally at the under side of the upper bar 7, this lower slide being preferably formed with a bearing 28. A rack bar 29 is secured in fixed relation to the bar 7, the tooth spaces of the bar being relatively deep and a shaft 30 is journaled in the bearing 28 of the lower slide 27 and carries a head 31 which is provided with a pair of diametrically spaced pins 32 and 33, the pin 32 being relatively short or of a length just sufficient to properly engage the rack bar 29 while the pin 33 is relatively longer, it projecting upwardly through the rack bar and is adapted to operate in a groove or channel 34 which is formed in the slide 25 for the belt-shifting guide and is arranged perpendicular to the direction of movement of this slide.

The lower guide bar 8 slidably supports upper and lower slides 35 and 36 which are generally similar in construction to the slides 27 and 25 respectively, the slide 35 having a bearing 37 for the shaft 38 and also a bearing 39 for the shaft 40 which is provided preferably with an operating crank 41. A rack member 42 is also mounted in fixed relation to the lower guide bar 8 and the shaft 38 is provided with a head 43 carrying diametrically opposed pins 44 and 45, the pin 44 being relatively short or of a length just sufficient to properly engage the toothed bar 42 while the pin 45 is relatively longer and operates in a groove or channel 46 which is arranged transversely in the lower slide 36, the latter being also provided with a suitable belt-shifting guide which in the present instance is in the form of a loop 47. The shafts 30 and 38 are preferably connected adjustably by a telescopic or other suitable coupling section 48, and suitable means is provided for rotating the coupled shafts 30 and 38, a bevel gear 49 being fixed on the shaft 38 in the present instance and coöperates with a bevel gear 50 on the crank shaft 40. The heads 31 and 43 for operating the upper and lower belt-shifting guides respectively are so related that the relatively long pin 33 for operating the upper belt guide is in reversed or diametrically opposed relation to the relatively long pin 45 which operates the lower belt-shifting guide.

The operation of the belt-shifting mechanism may be briefly described as follows: Assuming that the belt occupies the relative position shown in Fig. 1 and that it is desirable to shift the belt to the right or for the purpose of transferring the belt from a cone section or step of relatively large diameter to the next step of relatively smaller diameter, the crank 41 will be turned thereby imparting rotation to the upper and lower shafts 30 and 38. By reference to the diagram in Fig. 8 it will be observed that the first part of the movement of the crank will cause the relatively long pin 33 to leave a tooth space in the upper bar 29 and to operate in an arc, the shorter pin 32 acting as a fulcrum. As this relatively long pin 33 engages in the transverse groove or channel 34 in the slide 25 for the upper belt-shifting guide, such guide will be shifted in a direction to transfer the belt to the next adjacent step of the corresponding pulley. While the pin 33 is operating to shift the upper belt guide, the relatively short pin 44 will leave a tooth space in the lower rack bar 42 and will enter another tooth space in this bar, the long pin 45 engaging the bar 42 as a fulcrum. Therefore, during the first half revolution of the shafts 30 and 38, the slides 27 and 35 carrying the shafts 30 and 38 will shift one step in unison, while the slide 25 for the upper belt-shifting guide will receive a full movement of a degree sufficient to carry the belt to the next adjacent or smaller step of the corresponding pulley. The second half revolution of the shafts 30 and 38 will cause the relatively long pin 45 to shift the lower slide 36 to an extent sufficient to cause the belt-shifting guide thereon to transfer the belt to the next adjacent step of the respective pulley, and during this second half revolution of the shafts 30 and 38, the slide 25 for the upper belt-shifting guide remains idle or stationary, as the relatively short pin 32 will, during this time, operate upon the rack bar 29 while the relatively long pin 33 serves as a relatively stationary fulcrum. After the belt-shifting guides have been operated, the two pairs of pins will be arranged in substantial alinement with the respective rack bars and they will tend to lock the belt guides from shifting under the influence of the belt. It is also preferable to so arrange the mechanism that the operating handle or crank 41 will hang in vertical position when the two belt-shifting guides are in proper operative relation, the weight of this crank thereby overcoming any tendency of the belt-shifting guides to alter their position, except when the crank is operated for such purpose.

I claim as my invention:—

1. In a belt shifter for cone pulleys, the combination of a pair of cone pulleys, a transmission belt coöperative therewith, a pair of belt-shifting guides for the respective pulleys, relatively fixed racks on which the respective guides are slidable, and means coöperative with said racks and the respective guides for shifting said guides alternately in the same direction, the movement of one guide being in advance of the movement of the other guide.

2. In a belt shifter, the combination of a pair of cone pulleys mounted on parallel axes, a transmission belt connecting them, a pair of belt-shifting guides coöperative with the respective pulleys, relatively fixed racks on which the respective guides are slidable, and means operatively connecting said guides and the respective racks for shifting the guides in the same direction, one in advance of the other, said means being also operative to lock the guides in different shifted positions on their respective racks.

3. In a belt shifter, the combination of a pair of cone pulleys, a belt coöperative therewith, a pair of belt-shifting guides, a corresponding pair of racks on which said guides are mounted to reciprocate axially and in coöperative relation with the respective pulleys, and means coöperative with said racks for shifting the guides in the same direction and one in advance of the other, such shifting means also coöperating with their respective racks as locks to retain the guides in different operative positions.

4. In a belt shifter, the combination of a pair of cone pulleys, a transmission belt coöperative therewith, belt-shifting guides for the respective pulleys, racks on which the respective guides are slidable, and an operative connection between said guides and coöperative with said racks for shifting the guides in alternate order and embodying projections adapted to be arranged in parallelism and engagement with the racks for retaining the guides in different shifted positions.

5. In a belt shifter, the combination of a pair of pulleys, a transmission belt coöperative therewith, a pair of belt-shifting guides, and means for operating said guides embodying racks on which the respective guides are slidable longitudinally, and a pair of connected shafts carried by the respective guides and provided with pins coöperative with the respective racks, to shift said guides and to lock them in different shifted positions.

6. In a belt shifter, the combination of a pair of pulleys, a transmission belt coöperative therewith, a pair of belt-shifting guides for the respective pulleys, and means for shifting said guides in alternate order comprising racks for the respective guides, and a pair of connected shafts each carrying a pair of projections of different lengths, the longer projections for the respective shafts being in reversed relation and adapted to coöperate with the belt-shifting guides to shift them in alternate order.

7. In a belt shifter, the combination of a pair of pulleys, a hanger for supporting one of the pulleys, a transmission belt connecting the pulleys, a belt-shifting guide, means for supporting said guide from said hanger embodying a clamping bracket adapted to coöperate with the hanger, an arm pivotally connected to the bracket and adjustable on an axis parallel to the axis of the respective pulley, and a guide bar secured to said arm and having the belt-shifting guide slidably mounted thereon in parallelism with the axis of the respective pulley.

8. In a belt shifter, the combination of a pair of pulleys, a transmission belt connecting them, a belt-shifting guide for one of the pulleys, and means for supporting said guide comprising a bar parallel to the axis of the respective pulley and on which the guide is mounted slidably, a bracket, clamping jaws supported rotatably on said bracket and engaging said bar, and a curved base on which said bracket is adjustable circumferentially about an axis parallel to the axis of the respective pulley.

In testimony whereof I have hereunto set my hand in presence of two subscribing witnesses.

LOUIS T. HAGAN.

Witnesses:
J. A. BOONE,
T. S. BUSH.